United States Patent
Walter et al.

(10) Patent No.: US 7,131,921 B2
(45) Date of Patent: Nov. 7, 2006

(54) BELT-DRIVEN CONICAL-PULLEY TRANSMISSION

(75) Inventors: Bernhard Walter, Oberkirch (DE); Elmar Lorenz, Hügelsheim (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/075,419

(22) Filed: Mar. 7, 2005

(65) Prior Publication Data

US 2005/0209031 A1    Sep. 22, 2005

Related U.S. Application Data

(63) Continuation of application No. PCT/DE03/02877, filed on Aug. 30, 2003.

(30) Foreign Application Priority Data

| Sep. 5, 2002 | (DE) | ................................. 102 41 533 |
| Sep. 6, 2002 | (DE) | ................................. 102 41 901 |
| Oct. 22, 2002 | (DE) | ................................. 102 49 319 |

(51) Int. Cl.
*F16H 55/56* (2006.01)

(52) U.S. Cl. .............................. 474/8; 474/18; 474/43

(58) Field of Classification Search ............... 474/8, 474/46, 18–19, 28, 43; 451/239; 477/45–19; 475/45, 210; 219/50

See application file for complete search history.

(56) References Cited

U.S. PATENT DOCUMENTS

| 1,963,355 | A | * | 6/1934 | Davis ........................... 219/50 |
| 5,184,981 | A | * | 2/1993 | Wittke .......................... 474/19 |
| 6,336,878 | B1 | * | 1/2002 | Ehrlich et al. ................ 474/28 |
| 6,342,024 | B1 | * | 1/2002 | Walter et al. ................ 475/210 |
| 2001/0031678 | A1 | | 10/2001 | Schmid et al. ................ 474/18 |

FOREIGN PATENT DOCUMENTS

| DE | 195 44 644 A1 | 6/1996 | |
| DE | 195 55 091 A1 | 5/2000 | |
| EP | 0185180 A1 * | 6/1896 | ................. 451/239 |
| GB | 901192 | 7/1962 | |
| JP | 55-51158 A * | 4/1980 | ................. 474/28 |
| JP | 59-65668 A * | 4/1994 | ................. 475/45 |
| JP | 08-141849 A * | 6/1996 | |
| JP | 11-141633 A * | 5/1999 | |

* cited by examiner

*Primary Examiner*—Marcus Charles
(74) *Attorney, Agent, or Firm*—Alfred J. Mangels

(57) ABSTRACT

A continuously variable transmission having two pairs of conical disks operatively connected by an endless torque-transmitting belt. One of each of the disk pairs is axially movable relative to the other along a supporting shaft. The movable disk includes an inner tooth system that engages with an outer tooth system formed on the supporting shaft. The internal tooth system can be produced by a broaching process. The inner tooth system extends outwardly of the conical disk.

31 Claims, 3 Drawing Sheets

BELT-DRIVEN CONICAL-PULLEY TRANSMISSION

CROSS-REFERENCE TO RELATED APPLICATION

This is a continuation of International Application Serial No. PCT/DE2003/002913, with an international filing date of Sep. 3, 2003, and designating the United States, the entire contents of which is hereby incorporated by reference to the same extent as if fully rewritten.

BACKGROUND OF THE INVENTION

1. Field of the Invention

The invention concerns a steplessly adjustable, belt-driven conical-pulley transmission with two conical disk pairs that are adjustable in relation to each other—one on the input and one on the output side—whereby at least one of the conical disk pairs includes an axially displaceable conical disk with an inner tooth system, whereby the inner tooth system is in engagement with an outer tooth system carried by a shaft for torque transmission. The shaft on the input side is thereby connected with the second conical disk of the corresponding pair.

2. Description of the Related Art

Such belt-driven conical-pulley transmissions have become known through DE 42 34 294 A1 or DE 198 01 279 A1. Therefore, with respect to the basic construction of the arrangement or the application of such transmissions, reference is made to the state of the art, as well as to the further state of the art to be found, for example, under the international class F 16 H.

The present invention is based on the object of making the production of such transmissions more cost-efficient, particularly by making the conical disks required for the construction of such transmissions producible in an especially simple way.

That is achieved in accordance with the invention in a belt-driven conical-pulley transmission of the type described at the beginning by at least one of the features mentioned in the claims.

BRIEF DESCRIPTION OF THE DRAWINGS

Further advantages and appropriate design features or operating modes are explained in more detail in connection with the following figure description in which.

There is shown.

DESCRIPTION OF THE PREFERRED EMBODIMENTS

Figure 1:
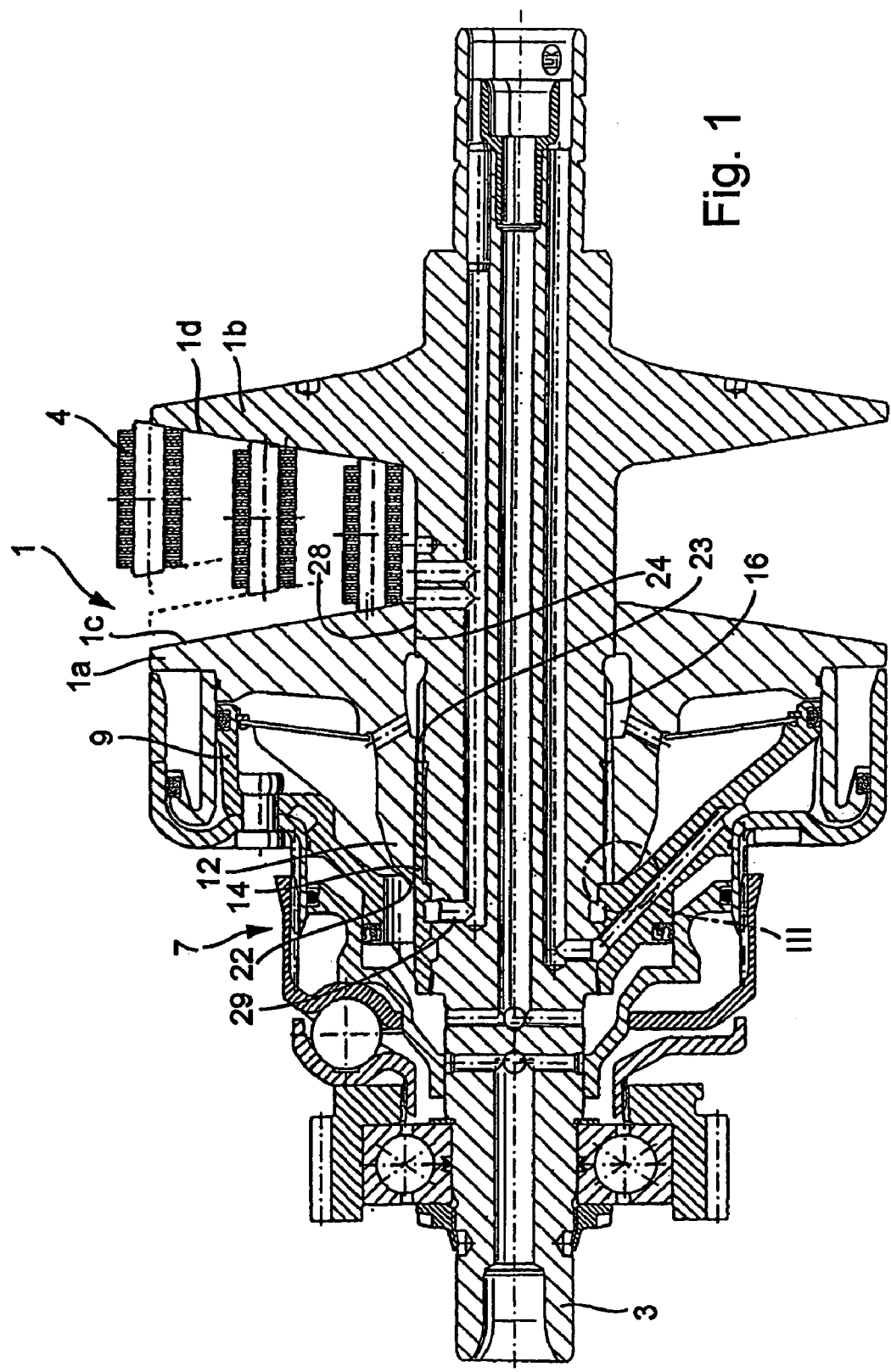
FIG. 1 shows a disk set of a conical disk pair of a not completely shown belt-driven conical-pulley transmission.
Figure 2:
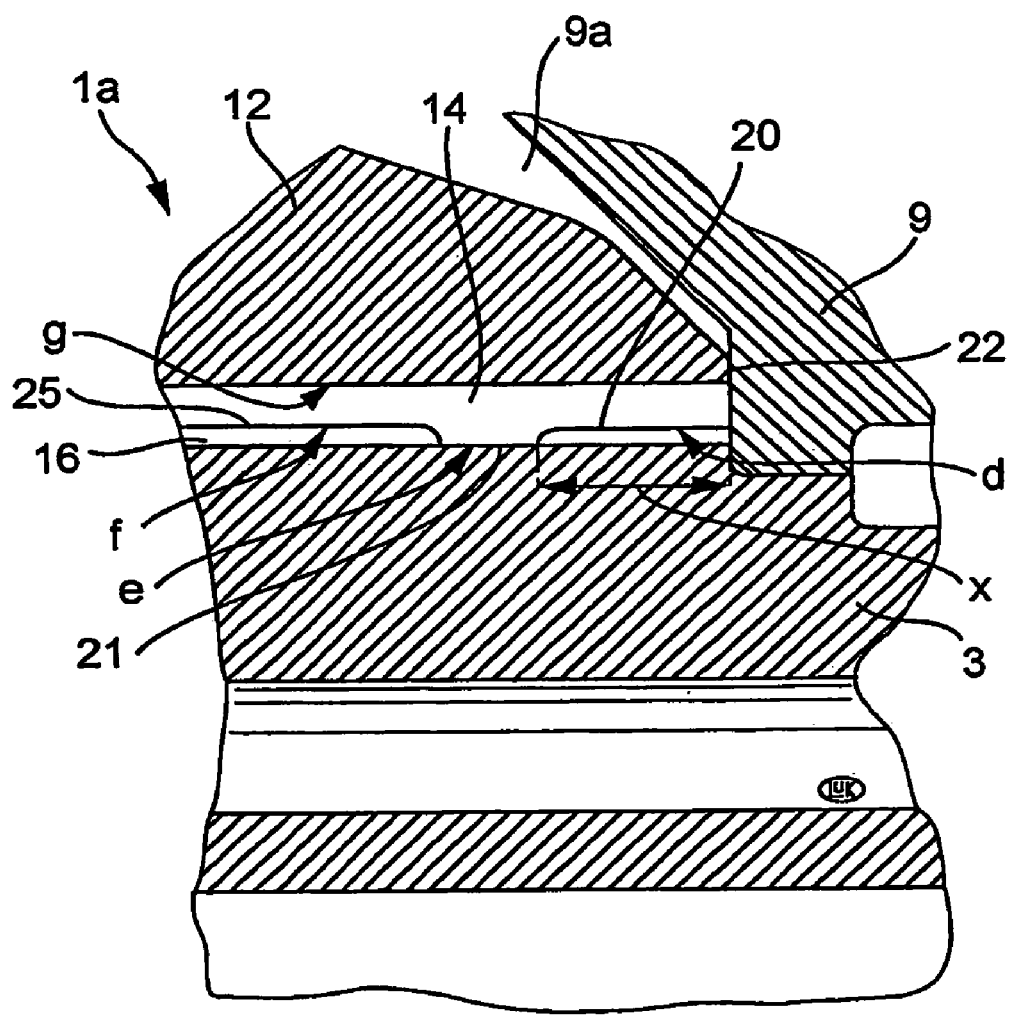
FIG. 2 shows an enlargement of detail III of FIG. 1.

The conical disk pair 1 shown in FIG. 1 can be functionally arranged in a transmission with another conical disk pair in a similar way, as is shown, for example, in FIGS. 1 and 2 of DE 198 01 279 A 1. Thereby, the advantageous arrangement of the conical disk pair 1 in the sense of the invention can be carried over to the second conical disk pair.

In FIG. 1 the disk pair 1 forms the input side disk pair drivable by an engine, the second—not shown—conical disk pair forms the output side conical disk pair of the corresponding transmission. The disk pair 1 is non-rotatably connected with a shaft 3.

Each disk pair—here the input side disk pair 1—has an axially displaceable disk 1a with axial end regions 22, 23, and each has an axially fixed disk 1b. In the illustrated embodiment, the disk 1b is arranged in one piece with the shaft 3. The disk 1b, as well as the not illustrated disk of the other disk set can, however, also be produced separately and drivingly coupled with the corresponding shaft by appropriate connections, such as, for example, welding, a tooth system, shrunk-on connections, or press-fit connections.

Between the two disk pairs, in a known way, an endless torque-transmitting means 4, especially in the form of a chain, is provided for torque transmission, which spans between the contact surfaces 1c, 1d of conical disks 1a, 1b.

The axially fixed disks can each carry not illustrated markings distributed over the periphery for determining the rotational speed and/or the angular position of the corresponding disk pair 1. Those markings can be formed in one piece with the corresponding disk, or else by an additional, attached component.

The disk 1a is axially displaceable by means of at least one piston/cylinder unit 7. In a similar way, the disk of the second disk set is also axially displaceable by a piston/cylinder unit. As can be seen from the Figure, the conical disk 1a directly forms a piston, which is inserted into a cylinder part 9, which is rigidly connected with the shaft 3. The axially displaceable disk 1a has an inner hub section 12, which has an inner tooth system 14. The shaft 3 has an outer tooth system 16, which is in engagement with the inner tooth system 14 of disk 1a for torque transmission purposes.

As further explained in the following in connection with FIG. 2, at least regions of at least one of the tooth systems 14, 16 serves for centering, or as centering aids for the disk 1a on the shaft 3.

In the second disk pair an arrangement, as for example appropriate centering, can take place in a similar way.

As can be gathered from FIG. 2, the shaft 3 has an outer tooth system 16 with an axial extension. In the hub section 12 of disk 1a, an inner tooth system 14 with an axial extension is provided. In the illustrated embodiment, the axial extensions are at least approximately equal, they can, however, also be different. The lengths of the tooth systems 14, 16, are dimensioned in such a way that in the furthest distance position of the two conical disks 1a, 1b shown in the upper half of FIG. 1, an axial overlap remains, which is dimensioned in such a way that the required torque transmission between the shaft 3 and the disk 1a is carried out damage free for at least the lifetime of the transmission.

At the end of the tooth system 16 facing away from conical disk 1b, shaft 3 has a cylindrical centering section 21 with an axial extent. That centering section 21 is preferably machined by grinding, and serves for centering, or as a centering aid, for the axially displaceable disk 1a. Here at least in certain places, preferably all sections of tooth system 14, which forms the outer diameter 23, of the teeth forming the inner tooth system 14, are mechanically worked or machined down and accordingly functionally adapted to the centering diameter 21. In an advantageous way the sections of the tooth system 14 bounding the outer diameter can be ground.

The centering section 21 is spaced from the axial end section 22 of the conical disk 1a a distance x so that in the support of conical disk 1a on shaft 3, support forces at the conical disk occurring due to the tension of the endless torque-transmitting means, act at an axial spacing upon the end section 22. Thereby tension cracks at the end section comprising weakened material can be prevented. In addition, the outer diameter d in the tooth system section 20 of the tooth system 16 is enlarged in the centering section 21 relative to the outer diameter e.

To radially free up the tooth system section in the end section 22 relative to the shaft 3, advantageously, the unmachined part of the conical disk 1a having an opening in its core is turned over the distance x to the diameter d before broaching the tooth system 14. Additionally, the end section 23 (see FIG. 1) facing the contact surface of the endless torque-transmitting means can have a bore, whereby the outer diameter f of the tooth system 16 in tooth section 25 can be shaped slightly larger than the outer diameter of the tooth system 16, and the centering 21 as a sliding seat can be limited to a narrow axial section. Thereby, the diameters d, f of the two accompanying outer diameters can be equal or different, advantageously, the outer diameter d is larger and can be so large that no tooth system remains received in the partial section 20.

Figure 3:
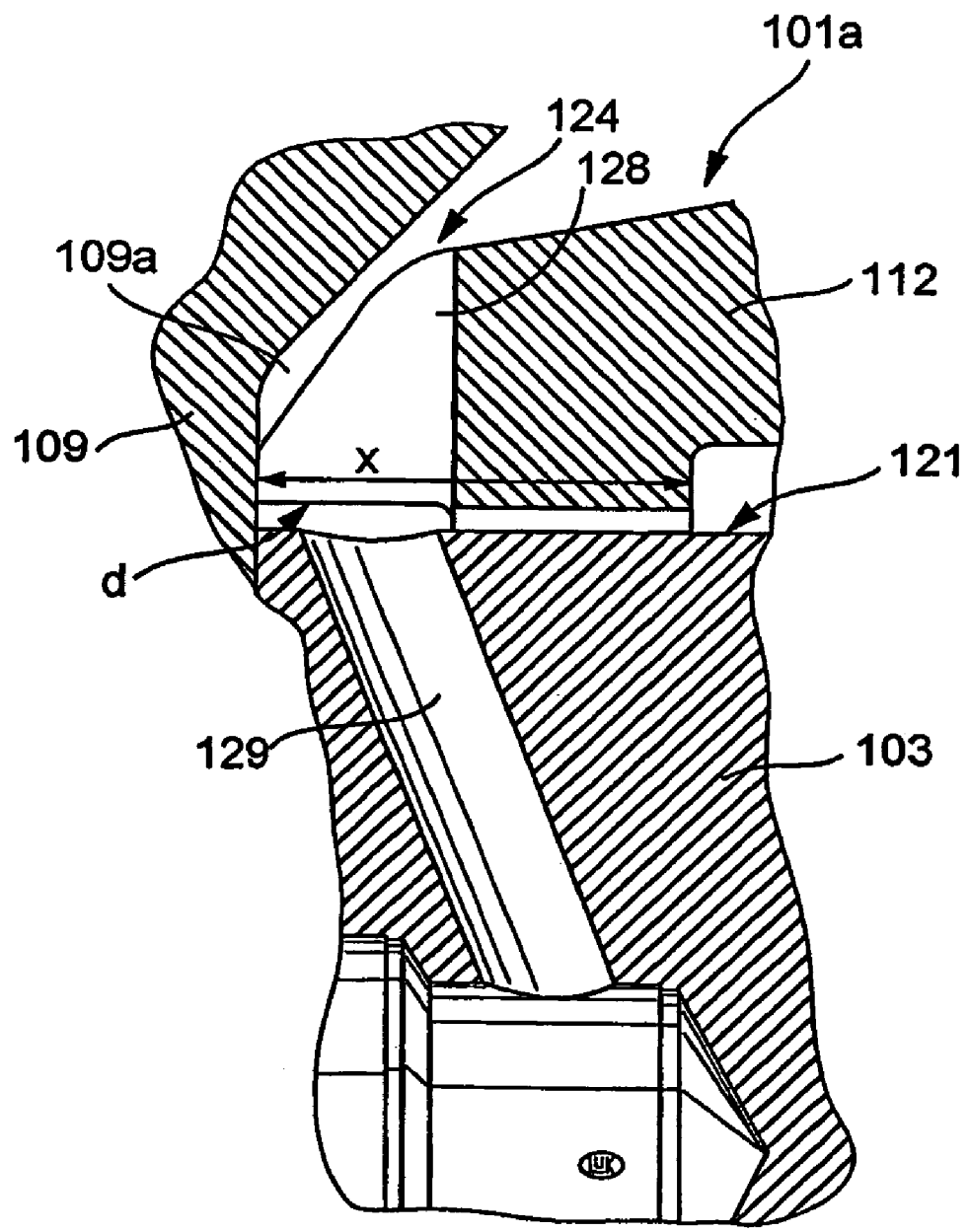
FIG. 3 shows a modification of the structure shown in detail III.

FIG. 3 shows a modification of the detail shown in FIG. 2, with a modified hub part 112, that provides one or several radial grooves 128 distributed around the periphery in the end section 124, that are connected with an oil conduit 129 positioned in the shaft 103. Thereby, a connection between the pressure volume 109a and the oil conduit 129 is also achieved with the hub part of the conical disk 101a positioned axially to the cylinder unit 109. In order to prevent an overload in that section, the centering section 121 is axially spaced from the groove 128 and displaced away from the end section 124 in the direction of the contact surface. That results from enlarging the diameter d in the section x. The enlarging of the diameter advantageously results by means of boring the opening of the conical disk. It is apparent that an enlargement of diameter d in the end section 124 is advantageous for displacing the centering section 121 independent of the transmission of the torque in a rotational direction. As a means for transmitting the torque there are, for example, eligible tooth systems, such as is for example described in FIGS. 1 and 2, as well as further engaged outer and inner profiles, and also by the utilization of grooves that are provided in shafts and conical disks with balls introduced.

The configuration of the hub section 12 of FIG. 2 furthermore has the advantage that the inner sections of the conical disk 1a, or the hub section 12, are arranged in such a way that the inner tooth system 14 radially completely protrudes against the axially adjacent sections 24 (see FIG. 1) of the conical disk 1a. Such a configuration has the advantage that the inner tooth system 14 can be produced in an especially simple way, that is by means of a broaching process. Therefore a broaching tool with a suitable profile for producing the tooth system 14 can be utilized in an especially advantageous manner, which is driven or pulled through the appropriately designed or formed center hole of the disk 1a. That is possible since on the basis of the design of the hub section 12 no sections are present, which radially overlap the tooth system 14.

It is suitable, if the inner diameter defined by the sections 24 is at least equally large, preferably larger, than the root diameter e of the tooth system 14, or the outer diameter of the tooth system 16.

As can further be seen from FIG. 1, the section 24 of the hub section 12 axially adjacent to the tooth system 14, at least over a partial length of its extension, forms a centering section, which is axially displaceably seated on an appropriately conforming section 28 of shaft 3.

The pressure chamber 9a bounded by the cylinder part g and the axially movable conical disk 1a, as can be seen from FIGS. 1 and 2, can be supplied with hydraulic oil through axial and radial bores in the shaft 3. That oil serves at the same time to lubricate the tooth system engagement, or the centering between the tooth system 14 and the centering section 21. Thereby, through a radial bore 29, oil can flow between the tooth gaps of the tooth system 14 into the pressure chamber 9a, or flow out of the pressure chamber 9a.

As described above, in accordance with the invention the inner tooth systems of the axially displaceable conical disks are preferably produced by a profiled broaching tool, whereby subsequent to the broaching process of the outer diameter section of the formed tooth system profile by machining or cutting, it is finished namely preferably by means of a grinding operation.

Although the outer tooth systems of the shafts, for example of the shaft 3 shown herein with outer tooth system 16, can be produced by means of a machining procedure, such as profile milling, it is especially advantageous in accordance with the invention if those tooth systems are produced by a forming process that produces a flow of material within the material forming the shafts. In an advantageous way, that can be a cold forming procedure. For some applications it can, however, also be appropriate if the shaping is performed when the steel forming the shafts is in a warm condition.

A cold forming operation of the tooth systems has the advantage that very close tolerances can be adhered to. It can also be especially appropriate, when first of all warm processing is used for producing the tooth systems, that is initially a warm forming first takes place, and the thus-formed profile is then cold-formed thereafter, that is practically a sizing takes place.

The latter process is especially suitable when utilizing materials for shafts that have a very high strength.

In an especially advantageous way suitable reshaping processes are rolling processes or roller-burnishing processes.

Roller-burnishing or rolling of the profiles for the tooth systems, for example the tooth system 16, can thereby be performed in several steps.

The production of the tooth systems by means of a forming process has the advantage that the root diameter e of the shaft tooth system 16 can be smaller than the outer diameter d of the inner tooth system 14, or the outer diameter of the centering section 21. That has the advantage that the centering section 21 can be brought to the desired dimension, for example by grinding, after forming the shaft outer tooth system.

If necessary, the sections bounding the outer diameter of the tooth systems that are at first only formed by material forming operations, such as tooth system 16, can also be finish machined, for example by grinding.

What is claimed is:

1. A steplessly adjustable, belt-driven conical-pulley transmission with two conical disk pairs that are adjustable in relation to each other—one on an input side and one on an output side, said transmission comprising: at least one of the conical disk pairs includes at least one conical disk that is axially displaceable on a shaft, with an inner tooth system that is in engagement with an outer tooth system provided on the shaft for torque transmission, wherein the inner tooth system is produced by a broaching process, and wherein an outer diameter of the inner tooth system is larger in a partial section of its axial extension.

2. A transmission, according to claim 1, wherein internal sections of the conical disk, which also form the inner tooth system, am arranged in such a way that the inner tooth system radially completely protrudes relative to the axially adjacent sections of the conical disk.

3. A transmission, according to claim 1, wherein the axially displaceable conical disk and the shaft that receives it are centered relative to each other at least in sections of at least one of the tooth systems.

4. A transmission, according to claim 3, wherein for centering the axially displaceable conical disk on the shaft that receives it, at least in sections of at least one of the tooth system sections that form an outer diameter of at least one of the tooth systems are machined.

5. A transmission according to claim 4, wherein the outer diameter is ground.

6. A transmission, according to claim 4, wherein at least sections of the tooth system sections forming the outer diameter of the inner tooth system are ground.

7. A transmission, according to claim 4, wherein sections of the tooth system sections forming the outer diameter of the inner tooth system are ground after broaching the inner tooth system.

8. A transmission, according to claim 1, wherein a centering system is provided on the outer tooth system of the shaft that is in axial connection with machined regions that form an outer diameter of the inner tooth system to cooperate for centering the conical disk relative to the shaft.

9. A transmission, according to claim 1, wherein the conical disk axially adjacent the inner tooth system has a centering section for centering on the shaft, whereby that centering section has a diameter, which at least corresponds to a root diameter of the inner tooth system of the axially displaceable conical disk.

10. A transmission, according to claim 1, wherein the outer tooth system of the shaft is produced by a forming process.

11. A transmission according to claim 10, wherein the outer tooth system of the shaft is produced by a cold forming process.

12. A transmission according to claim 10, wherein the outer tooth system of the shaft is roller-burnished.

13. A transmission according to claim 1, wherein an outer diameter of the outer tooth system of the shaft, which is first formed by material forming, is ground.

14. A transmission according to claim 1, wherein the outer diameter in that partial section corresponds approximately to a root diameter of the inner tooth system.

15. A transmission, according to claim 1, wherein the partial section is realized at an end of the conical disk facing away from a contact surface for an endless torque-transmitting means.

16. A transmission according to claim 1, wherein a partial section extends at least over the axial extension of at least one radial groove that is mounted at a front side end of the conical disk.

17. A transmission according to claim 1, wherein a partial section starting from both ends of the conical disk is provided, and in total do not correspond with the axial extension of the inner tooth system.

18. A transmission according to claim 17, wherein the partial section starting at an end of the conical disk with a contact surface for an endless torque-transmitting means has a larger outer diameter than the other partial section.

19. A transmission according to claim 1, wherein at least one partial section is bored before broaching the inner tooth system.

20. A steplessly adjustable, belt-driven conical-pulley transmission with two conical disk pairs that are adjustable in relation to each other—one on an input side and one on an output side, said transmission comprising: at least one of the conical disk pairs includes at least one conical disk that is axially displaceable on a shaft with an inner tooth system, which is in engagement with an outer tooth system provided on the shaft for torque transmission, and wherein the inner tooth system is produced by a broaching process, wherein a centering system is provided on the outer tooth system of the shaft that is in axial connection with machined regions that form an outer diameter of the inner tooth system to cooperate for centering the conical disk relative to the shaft, wherein a root diameter of the outer tooth system of the shaft has a smaller diameter than the centering section of the shaft in axial contact on the outer tooth system which cooperates with the outer diameter of the inner tooth system.

21. A transmission, according to claim 20, wherein internal sections of the conical disk, which also form the inner tooth system, are arranged in such a way that the inner tooth system radially completely protrudes relative to the axially adjacent sections of the conical disk.

22. A transmission, according to claim 20, wherein the axially displaceable conical disk and the shaft that receives it are centered relative to each other at least in sections of at least one of the tooth systems.

23. A transmission, according to claim 22, wherein for centering the axially displaceable conical disk on the shaft that receives it, at least in sections of at least one of the tooth system sections that form an outer diameter of at least one of the tooth systems are machined.

24. A transmission according to claim 23, wherein the outer diameter is ground.

25. A transmission according to claim 23, wherein at least sections of the tooth system sections forming the outer diameter of the inner tooth system are ground.

26. A transmission, according to claim 23, wherein sections of the tooth system sections forming the outer diameter of the inner tooth system are ground after broaching the inner tooth system.

27. A transmission, according to claim 20, wherein the conical disk axially adjacent the inner tooth system has a centering section for centering on the shaft, whereby that centering section has a diameter, which at least corresponds to a root diameter of the inner tooth system of the axially displaceable conical disk.

28. A transmission, according to claim 20, wherein the outer tooth system of the shaft is produced by a forming process.

29. A transmission according to claim 28, wherein the outer tooth system of the shaft is produced by a cold forming process.

30. A transmission according to claim 28, wherein the outer tooth system of the shaft is roller-burnished.

31. A transmission according to claim 20, wherein an outer diameter of the outer tooth system of the shaft, which is first formed by material forming, is ground.

* * * * *